(12) United States Patent
Kotani et al.

(10) Patent No.: US 10,647,863 B2
(45) Date of Patent: May 12, 2020

(54) FILM FORMING METHOD, IMAGE FORMING METHOD, FILM, AND INK COMPOSITION

(71) Applicant: CANON KABUSHIKI KAISHA, Tokyo (JP)

(72) Inventors: Yoshinori Kotani, Yokohama (JP); Kenichi Iida, Kawasaki (JP); Satoshi Yamabi, Yokohama (JP); Motokazu Kobayashi, Yokohama (JP); Shinichirou Yoshikawa, Nagareyama (JP); Toshihiko Sugimoto, Yokohama (JP); Takeshi Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/655,636

(22) Filed: Jul. 20, 2017

(65) Prior Publication Data

US 2017/0313897 A1    Nov. 2, 2017

Related U.S. Application Data

(63) Continuation of application No. PCT/JP2016/051655, filed on Jan. 21, 2016.

(30) Foreign Application Priority Data

Jan. 23, 2015  (JP) ................................ 2015-011626
Jan. 15, 2016  (JP) ................................ 2016-006444

(51) Int. Cl.
*B05D 7/24*     (2006.01)
*C09D 11/322*   (2014.01)
(Continued)

(52) U.S. Cl.
CPC .............. *C09D 11/322* (2013.01); *B05D 7/24* (2013.01); *B41J 2/01* (2013.01); *C09D 11/033* (2013.01);
(Continued)

(58) Field of Classification Search
CPC ............................... B05D 7/24; C09D 11/322
See application file for complete search history.

(56) References Cited

U.S. PATENT DOCUMENTS

| | | | |
|---|---|---|---|
| 2008/0131614 A1* | 6/2008 | Oriakhi | C09D 11/322 427/466 |
| 2009/0128611 A1* | 5/2009 | Kariya | B41J 11/002 347/106 |
| 2014/0288208 A1* | 9/2014 | Sasada | C09D 11/107 523/200 |

FOREIGN PATENT DOCUMENTS

| | | | |
|---|---|---|---|
| JP | 06183162 A | * | 7/1994 |
| JP | 11-507392 A | | 6/1999 |

(Continued)

*Primary Examiner* — Nathan H Empie
(74) *Attorney, Agent, or Firm* — Canon U.S.A. Inc., IP Division

(57) ABSTRACT

A film forming method includes forming a film on a substrate, in which the film includes first regions, second regions, and third regions, the first regions, the second regions, and the third regions being defined by a refractive index and a region size and being present in a mixed manner in a cross section parallel to a thickness direction, the first regions and the second regions have a refractive index at least 0.4 higher than the third regions, the second regions are formed of high-refractive-index particles having an average particle size of 10 nm or more and 100 nm or less, the first regions are formed of the high-refractive-index particles that have been aggregated, the first regions having an equivalent circular diameter of 250 nm or more, and the third regions have an equivalent circular diameter of more than 100 nm.

10 Claims, 5 Drawing Sheets

(51) Int. Cl.
    *B41J 2/01*           (2006.01)
    *C09D 11/033*      (2014.01)
    *C09D 11/102*      (2014.01)
    *C09D 11/107*      (2014.01)

(52) U.S. Cl.
    CPC .......... *C09D 11/102* (2013.01); *C09D 11/107* (2013.01)

(56) References Cited

FOREIGN PATENT DOCUMENTS

| | | | |
|---|---|---|---|
| JP | 2009001472 A | * | 1/2009 |
| JP | 2011-062946 A | | 3/2011 |
| JP | 2011-133804 A | | 7/2011 |
| JP | 2012-017383 A | | 1/2012 |
| JP | 2012017383 A | * | 1/2012 |
| JP | 2014-077950 A | | 5/2014 |
| JP | 2014-095058 A | | 5/2014 |
| JP | 2015-174868 A | | 10/2015 |
| WO | 1998-050473 A1 | | 11/1998 |

* cited by examiner

FILM FORMING METHOD, IMAGE FORMING METHOD, FILM, AND INK COMPOSITION

CROSS-REFERENCE TO RELATED APPLICATIONS

This application is a Continuation of International Patent Application No. PCT/JP2016/051655, filed Jan. 21, 2016, which claims the benefit of Japanese Patent Application No. 2015-011626, filed Jan. 23, 2015 and No. 2016-006444, filed Jan. 15, 2016, all of which are hereby incorporated by reference herein in their entirety.

TECHNICAL FIELD

The present invention relates to a film forming method, an image forming method, a film, and an ink composition.

BACKGROUND ART

There has recently been a strong need for a method for forming an image on a substrate of a color other than white, for example, a transparent or translucent film, or colored paper in a commercial printing market. When an image is formed on any of these substrates of a color other than white, a white image needs to be formed.

A method in which a film is formed on a substrate with a white ink containing white pigment particles dispersed therein is known as one of the methods of forming white images. Generally, metal oxide particles such as titanium oxide particles are often used as white pigment particles. Because the metal oxide particles have high densities, when a white ink containing the metal oxide particles dispersed therein is allowed to stand in an ink tank, the particles are settled with time. When the particles are settled in the ink tank, a film to be formed can have nonuniformity, and, furthermore, a nozzle can be clogged. Thus, the ink in the ink tank needs to be circulated or agitated at regular intervals.

Japanese Patent Laid-Open No. 2014-95058 discloses a white ink containing titanium oxide particles having a small particle size and hollow resin particles having a low specific gravity in order to inhibit settling of the particles in an ink tank.

CITATION LIST

Patent Literature

PTL 1 Japanese Patent Laid-Open No. 2014-95058

In the white ink described in Japanese Patent Laid-Open No. 2014-95058, the titanium oxide particles having an average particle size of 10 nm or more and 200 nm or less are used in order to inhibit settling of the ink. A smaller particle size of the white pigment particles in a film on a substrate results in a lower degree of whiteness of the film. Thus, when a film is formed on a substrate with the white ink described in the Japanese Patent Laid-Open No. 2014-95058, the film has an insufficiently high degree of whiteness, in some cases.

It is an object of the present invention to form a film having a higher degree of whiteness than ever before while the settling of particles in an ink is inhibited.

SUMMARY OF INVENTION

One aspect of the present invention is directed to providing a film forming method that includes forming a film on a substrate, in which the film includes first regions, second regions, and third regions, the first regions, the second regions, and the third regions being defined by a refractive index and a region size and being present in a mixed manner in a cross section parallel to a thickness direction, the first regions and the second regions have a refractive index at least 0.4 higher than the third regions, the second regions are formed of high-refractive-index particles having an average particle size of 10 nm or more and 100 nm or less, the first regions are formed of the high-refractive-index particles that have been aggregated, the first regions having an equivalent circular diameter of 250 nm or more, and the third regions have an equivalent circular diameter of more than 100 nm.

Further features of the present invention will become apparent from the following description of exemplary embodiments with reference to the attached drawings.

DESCRIPTION OF EMBODIMENTS

Embodiments of the present invention will be described below in detail with appropriate reference to the attached drawings.

First Embodiment

Figure 1:
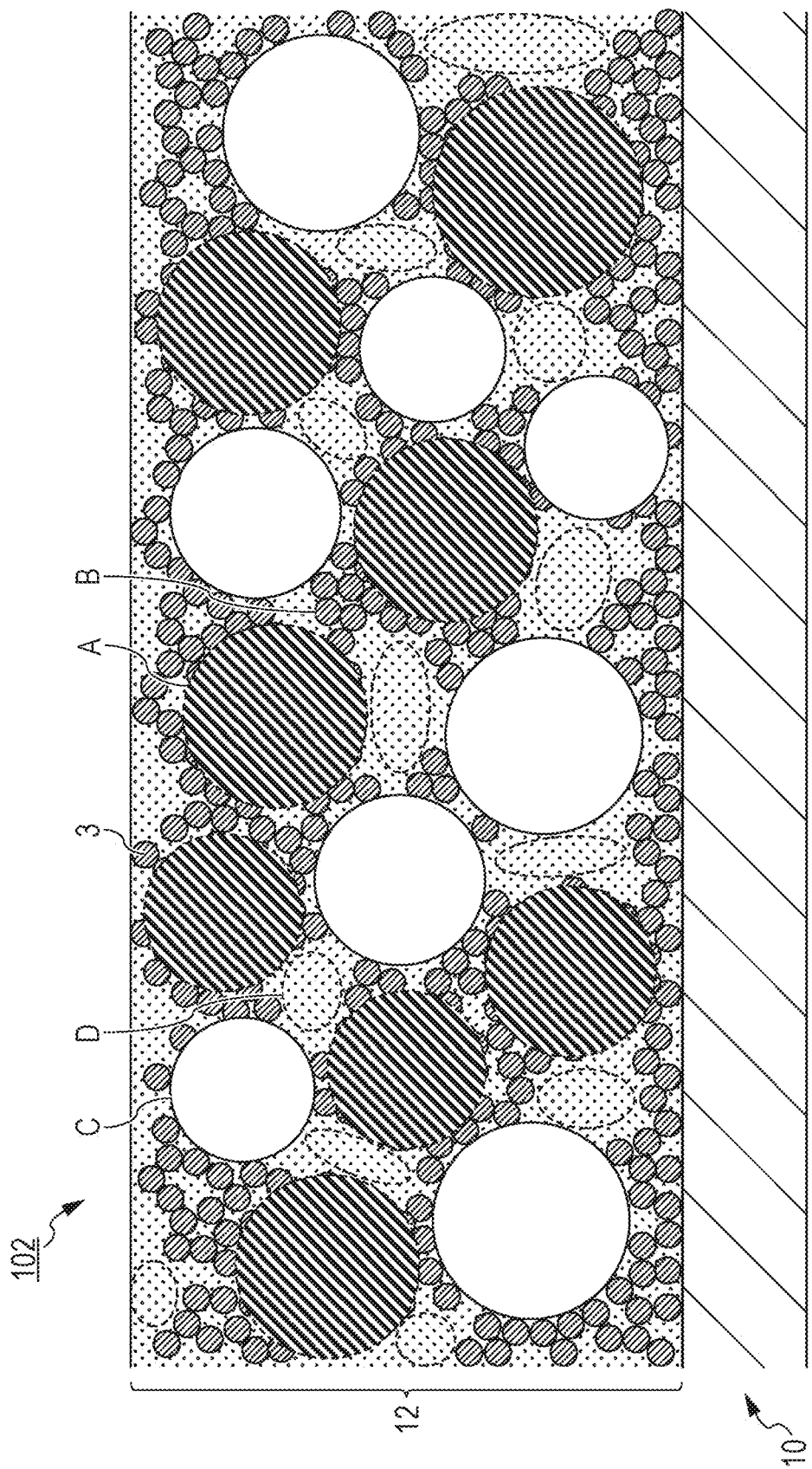
FIG. 1 is a cross-sectional view of a film formed on a substrate according to a first embodiment.

A film forming method according to this embodiment is a method for forming a film 12 on a substrate 10. FIG. 1 is a cross-sectional view of the film 12 formed on the substrate 10 according to a first embodiment. An image forming method according to an embodiment is a method for forming an image by forming a film on a substrate using the foregoing film forming method. A printed material 102 formed by the image forming method according to the embodiment includes the substrate 10 and the film 12 disposed on the substrate 10. The film 12 is preferably a white film. The formation of the white film 12 forms a white image.

The film 12 includes first regions A, second regions B, third regions C, and fourth regions D that are defined by a refractive index and a region size and that are present in a mixed manner. The phrase "present in a mixed manner" used here refers to a state in which, for each type of regions, the regions are present in the thickness direction and in directions perpendicular to the thickness direction. That is, all types of the regions are present in the film in a state of being dispersed.

First Region A

The first regions A have a refractive index at least 0.4 higher than any of the third regions C and the fourth regions D. This results in high light reflectances at interfaces between the first regions A and the third regions C and between the first regions A and the fourth regions D. Light incident on the film 12 is diffusely reflected or diffused at the interfaces and so forth to improve the degree of whiteness of the film 12.

The first regions A have an equivalent circular diameter of 250 nm or more. The first regions A preferably have an equivalent circular diameter of 500 nm or less. An equivalent circular diameter of the first regions A of 250 nm or more results in an improved degree of whiteness of the film 12. An equivalent circular diameter of the first regions A of 500 nm or less results in an increased proportion of interfaces between the first regions A and the other regions in the film 12, thus leading to an improved degree of whiteness of the film 12.

The equivalent circular diameter of each of the first regions A can be measured from an electron micrograph of a cross section of the film 12 in the thickness direction. The equivalent circular diameter may also be measured by subjecting the electron micrograph to image processing. The equivalent circular diameter of the other regions described below can also be similarly measured.

The first regions A may have any refractive index as long as the refractive index of the first regions A is at least 0.4 higher than any of those of the third regions C and the fourth regions D, and preferably has a refractive index of 1.7 or higher and 2.8 or lower. An increased refractive index of the first regions A results in an improved degree of whiteness of the film 12.

The refractive index of the first regions A can be calculated on the basis of the refractive index of a material contained in the first regions A. For example, when the first regions A are formed of titanium oxide particles, the refractive index of the first regions A can be regarded as the refractive index of titanium oxide.

Examples of a material that is contained in the first regions A and that can be preferably used include titanium oxide, barium, titanate, zirconium, oxide, zinc oxide, and niobium oxide. Of these, titanium oxide is preferred in view of the degree of whiteness and the cost. Titanium oxide has a refractive index of 2.52 to 2.71, depending on the crystal structure.

Second Region B

The second regions B have a refractive index at least 0.4 higher than any of the third regions C and the fourth regions D. This results in high light reflectances at interfaces between the second regions B and the third regions C and between the second regions B and fourth regions D. Light incident on the film 12 is diffusely reflected or diffused at the interfaces and so forth to improve the degree of whiteness of the film 12.

The second regions B are formed of high-refractive-index particles 3.

The high-refractive-index particles 3 have a refractive index at least 0.4 higher than any of the third regions C and the fourth regions D. This results in high light reflectances at interfaces between the high-refractive-index particles 3 and the third regions C and between the high-refractive-index particles 3 and the fourth regions D. Light incident on the film 12 is diffusely reflected or diffused at the interfaces and so forth to improve the degree of whiteness of the film 12.

The high-refractive-index particles 3 may have any refractive index as long as the refractive index of the high-refractive-index particles 3 is at least 0.4 higher than any of those of the third regions C and the fourth regions D, and preferably has a refractive index of 1.7 or higher and 2.8 or lower. An increased refractive index of the high-refractive-index particles 3 results in an improved degree of whiteness of the film 12.

Examples of the high-refractive-index particles 3 that can be preferably used include titanium oxide particles, barium titanate particles, zirconium oxide particles, zinc oxide particles, and niobium, oxide particles. Of these, titanium oxide particles are preferred in view of the degree of whiteness and the cost. The titanium, oxide particles have a refractive index of 2.52 to 2.71, depending on the crystal structure.

The high-refractive-index particles 3 have an average particle size of 10 nm or more and 100 nm or less. The high-refractive-index particles 3 preferably have an average particle size of 10 nm or more and 50 nm or less. The use of an average particle size of the high-refractive-index particles 3 of 100 nm or less can reduce regions where only the third region C and the fourth region D are present in the thickness direction of the film 12.

The regions where only the third region C and the fourth region D are present in the thickness direction of the film 12 tend to have a low ability to shield the substrate 10, i.e., low shielding properties. The film. 12 is preferably formed in such a manner that at least one high-refractive-index region (the first region A or second region B) and at least one low-refractive-index region (the third region C or the fourth region D) are present in the thickness direction of the film 12. In other words, the film 12 is formed in such a manner that when light is transmitted through the film 12, one of the first regions A, one of the second regions B, one of the third regions C, and one of the fourth regions D are present on a straight line where the light travels. In this embodiment, the use of the high-refractive-index particles 3 having a smaller: average particle size than the equivalent circular diameter of the first regions A can reduce the regions where only the third region C and fourth region D are present. This results in an improved degree of whiteness of the film 12.

Third Region C

The third regions C have a refractive index at least 0.4 lower than any of the first regions A and the second regions B. This results in high light reflectances at interfaces between the third regions C and the first regions A and between the third regions C and the second regions B. Light incident on the film 12 is diffusely reflected from, the interfaces and so forth to improve the degree of whiteness of the film 12.

The third regions C may have any refractive index as long as the refractive index of the third regions C is at least 0.4 lower than any of those of the first regions A and the second regions B. The refractive index of the third regions C is preferably at least 0.8, more preferably at least 1.0 lower than any of those of the first regions A and the second regions B. The third regions C preferably have a refractive index of 1.0 or higher and lower than 1.7. A lower refractive index of the third regions C can result, in larger differences in refractive index between the third, regions C and the first regions A and between the third regions C and the second regions B, thus leading to an improved, degree of whiteness of the film 12.

The third regions C can be formed of, for example, solid or hollow particles composed of a low-refractive-index material such as a polymer material, pores, or voids. Examples of the low-refractive-index material that can be used include acrylic resins, styrene resins, styrene-acrylic resins, fluororesins, silica, and magnesium fluoride.

Of these, the third regions C are preferably formed of hollow particles. In particular, hollow particles having a shell with a thickness of 100 nm or less corresponding to ¼ or less of the wavelength of visible light are particularly preferably used. In this case, the differences in refractive index between the first regions A and the third regions C and between the second regions B and the third regions C can be regarded as the differences in refractive index between the first regions A and cavities in the hollow particles and between the second regions B and the cavities. Because air present in the cavities in the hollow particles has a refractive index of about 1.0, the differences in refractive index can be increased, thus further improving the degree of whiteness of the film 12. When hollow particles having a shell with a large thickness are used, light can be diffusely reflected or diffused at interfaces between the shells and the cavities of the hollow particles in addition to diffused reflection or diffusion at interfaces between the first regions A or second regions B and the shells of the hollow particles. This results in an increased degree of whiteness of the film 12.

The hollow particles are not limited as long as they include a cavity inside thereof. Examples thereof include hollow resin particles composed of acrylic resins, styrene resins, styrene-acrylic resins, methyl methacrylate resins. Examples of commercial items of the hollow particles that can be used include hollow particles having a high degree of crosslinking and hollow particles having a high degree of hollowness, available from JSR Corporation. Furthermore, hollow inorganic particles such as hollow silica particles may be used.

The third regions C have an equivalent circular diameter of more than 100 nm, and preferably 700 nm or less, more preferably 500 nm or less.

When the third regions C are formed of hollow particles, the hollow particles preferably have an average cavity size (inside diameter) of 100 nm or more and 400 nm or less, more preferably 100 nm or more and 350 nm or less. The hollow particles preferably have a hollowness of 20% or more by volume and 90% or less by volume.

The formation of the third regions C having a larger equivalent circular diameter than 100 nm in the film 12 enables light incident on the film 12 to be effectively subjected to diffuse reflection or diffusion, thus resulting in an improved degree of whiteness of the film 12.

The volume ratio of the third regions C in the film 12 is preferably 30% or more and 60% or less. A volume ratio of 30% or more results in an improved degree of whiteness of the film 12. A volume ratio of 60% or less results in improved mechanical strength of the film 12.

Fourth Region D

The fourth regions D have a refractive index at least 0.4 lower than any of the first regions A and the second regions B. This results in high light reflectances at interfaces between the fourth regions D and the first regions A and the fourth regions D and the second regions B. Light incident on the film 12 is diffusely reflected from the interfaces and so forth to improve the degree of whiteness of the film 12.

The fourth regions D may have any refractive index as long as the refractive index of the fourth regions D is at least 0.4 lower than any of those of the first regions A and the second regions B. The refractive index of the fourth regions D is preferably at least 0.8, more preferably at least 1.0 lower than any of those of the first regions A and the second regions B. The fourth regions D preferably have a refractive index of 1.0 or higher and lower than 1.7. A lower refractive index of the fourth regions D can result in larger differences in refractive index between the fourth regions D and the first regions A and between the fourth regions D and the second regions B, thus leading to an improved degree of whiteness of the film 12.

The fourth regions D can be formed of pores or voids.

The fourth regions D have an equivalent circular diameter equal to or more than the average particle size of the high-refractive-index particles 3 and less than the equivalent circular diameter of the third regions C.

In the film forming method according to the embodiment, the formation of the film in which the first regions A, the second regions B, the third regions C, and the fourth regions D are arranged in a mixed manner enables the film to have a high degree of whiteness.

The film 12 cam be formed by attaching the ink composition containing, for example, the particles constituting the first regions A and the second regions B and the high-refractive-index particles 3 onto the substrate 10. Any method for attaching the ink composition onto the substrate 10 may be employed. For example, an Inkjet method in which droplets of an ink composition are flown and landed on the substrate 10 can be preferably employed. Examples of the Inkjet method include thermal jet-type Inkjet methods and piezoelectric-type Inkjet methods.

Examples of the substrate 10 include, but not limited to, paper, films composed of polymer materials such as vinyl chloride and PET, plastics, metals, woods, cloths, glass, and ceramics. The substrate 10 may be a recording medium. The substrate 10 may have any shape.

An ink composition according to an embodiment will be described below.

Ink Composition

The ink composition according to the embodiment contains particles constituting the first regions A and the second regions B and the high-refractive-index particles 3.

The total content by mass of the particles constituting the first regions A and the high-refractive-index particles 3 in the ink composition is preferably 1% or more and 20% or less, more preferably 5% or more and 15% or less based on the total mass of the ink composition. When the content of the particles is more than the upper limit, a head can be clogged at the time of the formation of an image by an inkjet method. When the content of the particles is less than the lower limit, the degree of whiteness of the film 12 tends to be insufficient.

When the ink composition is prepared, a commercially available dispersion containing white pigment-particles dispersed therein may be used. For example, TTO-W-5 neutral titania sol, available from Ishihara Sangyo Kaisha, Ltd., may be used.

The ink composition according to the embodiment may contain a dispersant to disperse the particles in the ink composition. The incorporation of the dispersant thereinto can result in improved ejection stability of the ink composition at the time of the ejection of the ink composition onto the substrate 10 by an Inkjet method. Any of dispersants that can be used for common pigment inks may be used. For example, a cationic dispersant, an anionic dispersant, a nonionic dispersant, or a surfactant may be used.

Examples of the anionic dispersant include poly(acrylic acid) and styrene-acrylic acid copolymers. Examples of the nonionic dispersant include poly(vinyl pyrrolidone) and poly(propylene glycol). Examples of the surfactant include sodium dodecylbenzenesulfonate and sodium laurate. Of these, a styrene-acrylic acid copolymer is preferably used from the viewpoint of improving the dispersion stability of the particles.

The dispersant also serves to bond the particles together in the film 12. The dispersant content is preferably 1% or more by weight and 20% or less by weight, more preferably 2% or more by weight and 10% or less by weight based on the total amount of the ink composition.

The ink composition according to the embodiment may contain a surfactant such as an acetylene glycol-based surfactant or polysiloxane-based surfactant. The addition of the surfactant can result in the improved wettability of a recording surface of the substrate 10 with respect to the ink composition and the permeability of the ink composition to the recording surface of the substrate 10.

An example of the acetylene glycol-based surfactant is polyoxyethylene (POE) (10) acetylene glycol. A commercially available acetylene glycol-based surfactant such as Acetylenol E100 (available from Kawaken Fine Chemicals Co., Ltd.) may also be used.

The ink composition according to the embodiment may further contain another surfactant such as an anionic surfactant, a nonionic surfactant, or an amphoteric surfactant.

The content of the surfactant exemplified above is preferably 0.01% or more by mass and 5% or less by mass, more preferably 0.1% or more by mass and 1% or less by mass based on the total mass of the ink composition.

The ink composition according to the embodiment may further contain a resin serving as a binder in order to improve the fixability of the film to the substrate. Examples of a binder resin include urethane-based resins, acrylic-based resins, and methacrylic-based resins. Each of the resins may be used in the form, of an emulsion, in which particles thereof are dispersed in a solvent or in the form of a solution in which the resin is dissolved in a solvent. The resin, content is preferably 0.1% or more by weight and 10% or less by weight, more preferably 0.5% or more by weight and 5% or less by weight based on the total amount of the ink composition.

The ink composition according to the embodiment may further contain a polyhydric alcohol. The addition of the polyhydric alcohol can reduce the drying rate of the ink. For example, when the ink composition is ejected onto the substrate 10 by an Inkjet method, the use of the ink composition containing the polyhydric alcohol can prevent a head from being clogged with the ink composition.

Examples of the polyhydric alcohol include glycerol, ethylene glycol, diethylene glycol, triethylene glycol, poly (ethylene glycol), and poly(propylene glycol).

The polyhydric alcohol content is preferably 0.1% or more by mass and 20% or less by mass, more preferably 0.5% or more by mass and 10% or less by mass based on the total mass of the ink composition.

The ink composition according to the embodiment usually contains water as a solvent. Deionized water, ultrafiltered water, water obtained by reverse osmosis, or ultrapure water is preferably used as the water. An organic solvent may be used as the solvent in combination with water. Examples of the organic solvent include alcohols such as ethanol, methanol, butanol, and propanol.

Second Embodiment

Figure 2:
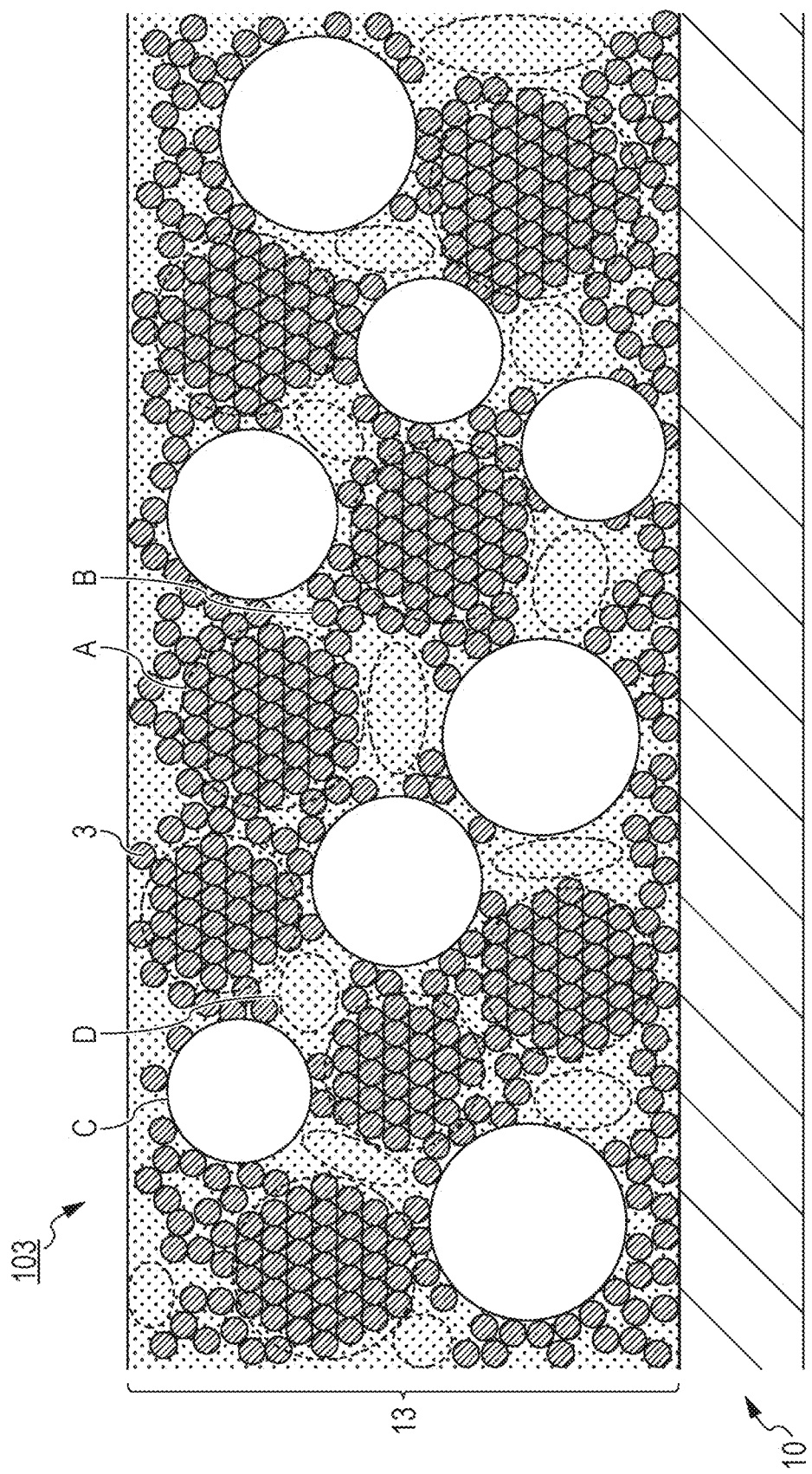
FIG. 2 is a cross-sectional view of a film formed on a substrate according to a second embodiment.

A film forming method according to this embodiment is a method for forming a film 13 on the substrate 10. FIG. 2 is a cross-sectional view of the film 13 formed on the substrate 10 according to a second embodiment. An image forming method according to an embodiment is a method for forming an image by forming a film on a substrate using the foregoing film forming method. A printed material 103 formed by the image forming method according to the embodiment includes the substrate 10 and the film 13 disposed on the substrate 10. The film 13 is preferably a white film. The formation, of the white film 13 forms a white image.

Similarly to the first embodiment, the film 13 the first regions A, the second regions B, the third, regions C, and the fourth regions D that are defined by a refractive index and a region size and that are present in a mixed manner. Descriptions of the same structure as that of the first embodiment are not redundantly repeated, and only a structure specific to the second embodiment will be described below.

First Region A

In this embodiment, the first regions A are regions where the high-refractive-index particles 3 are aggregated. That is, the first regions A are formed of secondary particles formed by the aggregation of the high-refractive-index particles 3.

In the film forming method according to the embodiment, preferably, after the ink composition is ejected or applied, the high-refractive-index particles 3 in the ink composition are aggregated to form the first regions A. More preferably, after the ink composition is attached to the substrate 10, the high-refractive-index particles 3 are aggregated to form the first regions A.

In this way, the first regions A are not formed of particles having a large particle size but are formed of the high-refractive-index particles 3 having a small particle size, thus inhibiting the settling of the particles in the ink composition.

It is known from the Stokes' equation that a smaller particle size can result in a lower settling rate of particles dispersed in a dispersion medium. When water is used as a dispersion medium, the use of particles having a particle size of 100 nm or less enables the inhibition of the settling of the particles dispersed in the dispersion medium.

Examples of particles having a high refractive index include the foregoing metal oxide particles, which have a high specific gravity. The particles and the high-refractive-index particles 3 constituting the first regions A have a high specific gravity and tend to be easily settled if they have a large particle size. However, the high-refractive-index particles contained in the ink composition according to the embodiment have an average particle size of 100 nm or less. Thus, the state in which the particles are dispersed in the solvent is easily maintained. According to the embodiment, the resulting film has an improved degree of whiteness, and the ink composition has an improved storage stability.

The aggregation of the high-refractive-index particles 3 forms voids serving as the fourth regions D. This can result in a further improved degree of whiteness. Portions of the high-refractive-index particles 3 that have not been markedly aggregated constitute the second regions B.

As a method for aggregating the high-refractive-index particles 3, a method in which an inorganic metal salt containing a metal ion or an organic acid is used as an aggregating agent is known. As the inorganic metal salt, an inorganic salt containing a di- or higher-valent metal ion is preferred, and the inorganic salt is preferably soluble in water.

Specific examples of the polyvalent metal ion include divalent metal ions such as $Ca^{2+}$, $Mg^{2+}$, $Ba^{2+}$, and $Zn^{2+}$; and trivalent metal ions such as $Al^{3+}$ and $Fe^{3+}$. Examples of the type of salt include nitrates, acetates, sulfates, and chlorides. Of these, calcium nitrate is particularly preferred.

The content of the inorganic metal salt serving as an aggregating agent is preferably 0.001% or more by mass and 0.01% or less by mass, more preferably 0.001% or more by mass and 0.005% or less by mass based on the total mass of the ink composition. At a content of less than 0.001% by mass, the high-refractive-index particles 3 are not sufficiently aggregated, leading to an insufficiently improved degree of whiteness. At a content of more than 0.01% by mass, the aggregation of the high-refractive-index particles 3 proceeds in the ink composition, thus causing settling of the particles in the ink composition, In the film forming method according to the embodiment, after the aggregating agent-containing ink composition is ejected or applied to the substrate 10, the ink composition on the substrate 10 is dried to evaporate the solvent such as water in the ink composition. The concentration of the aggregating agent in the ink composition during the drying is gradually increased, thus enabling the high-refractive-index particles 3 to aggregate. The aggregation of the high-refractive-index particles 3 may not occur on the substrate 10 and may occur, for example, during the flying after the ejection of the ink composition.

EXAMPLES

While the present invention will be specifically described below by examples and comparative examples, the present invention is not limited to these examples.

Printed materials (films on substrates) obtained by the examples were observed with an S-4800 field emission scanning electron microscope (FESEM), available from Hitachi, Ltd., at an acceleration voltage of 5 kV. The S-4800 field emission scanning electron microscope (FESEM), available from Hitachi, Ltd., had a resolution of 1.0 nm (acceleration voltage: 15 kV, working distance: 4 mm) or 2.0 nm (acceleration voltage: 1 kV, working distance: 1.5 mm).

Production of Titanium Oxide Particles A

Titanium n-butoxide (TBOT) was added to an ethanol (EtOH) solution, to prepare a first solution. Then, a mixture of ethanol and 1% by weight aqueous ammonia ($NH_3$ (aq)) was added to the first solution. The resulting mixture was stirred for about a whole day to give a solution containing titanium oxide particles A. The molar ratio of the raw materials was TBOT:EtOH:$NH_3$(aq)=1:100:7.5.

Subsequently, the solution was subjected to centrifugal separation with a centrifuge, and the settled particles were washed with ethanol to give titanium oxide particles A. Titanium oxide particles A had an average particle size of about 300 nm.

Preparation of Ink Composition

Titanium oxide particles A, titanium oxide particles B, hollow particles, a dispersant, a polyhydric alcohol, a surfactant, an inorganic metal salt, and deionized water were mixed together in amounts listed in Table, and the resulting mixtures were stirred to prepare ink compositions of Examples 1 and 2 and Comparative examples 1 to 4. The units of values described in the examples and comparative examples in Table are percent by mass. The values of titanium, oxide particles B, the hollow particles, and the dispersant are given in units of percent by mass in terms of solid content.

As titanium, oxide particles A (high-refractive-index particles having a large particle size), the titanium oxide particles (average particle size: about 300 nm) produced by the foregoing method was used. As titanium oxide particles B (high-refractive-index particles having a small particle size), commercially available TTO-W-5 (available from Ishihara Sangyo Kaisha, Ltd.) was used TTO-W-5 was an aqueous sol of ultrafine particles composed of rutile titanium oxide and was a neutral sol (pH: 6 to 8) having a solid content of about 30% and an average particle size of several tens of nanometers.

As the hollow particles, commercially available SX868 (B) (available; from JSR Corporation) was used. SX868(B) contained hollow polymer particles dispersed in water and had an outside diameter of 500 nm, an inside diameter of 370 nm, and a solid content of about 20%.

As the dispersant, a styrene-acrylic resin (mass-average molecular weight: about 30,000) (resin A) was used. A solution of a styrene-acrylic acid copolymer was used, the solution having a solid content of about 22%. As a binder, a urethane resin (resin B) was used. An emulsion of a urethane resin dispersed in an aqueous solution was used and had a solid content of about 40%.

As the surfactant, Acetylenol E100 (available from Kawaken Fine Chemicals Co., Ltd.) was used. Acetylenol E100 was an acetylene glycol-based surfactant.

In Example 2, calcium nitrate was used as the inorganic metal salt.

TABLE

| | | Example 1 | Example 2 | Comparative example 1 | Comparative example 2 | Comparative example 3 | Comparative example 4 | Comparative example 5 |
|---|---|---|---|---|---|---|---|---|
| High-refractive-index particles | Titanium oxide particles A | 6.0 | — | — | — | — | — | 8.0 |
| | Titanium oxide particles B | 2.6 | 4.0 | 8.6 | 10.0 | — | 4.0 | — |
| Low-refractive-index particles | Hollow particles | 1.4 | 6.0 | 1.4 | — | 10.0 | 6.0 | — |
| Aggregating agent | Calcium nitrate | — | 0.003 | — | — | — | — | — |
| Others | Resin A | 5.0 | — | 5.0 | 5.0 | 5.0 | — | 5.0 |
| | Resin B | — | 3.0 | — | — | — | 3.0 | — |
| | Glycerol | 5.0 | — | 5.0 | 5.0 | 5.0 | — | 5.0 |
| | Propylene glycol | — | 3.0 | — | — | — | 3.0 | — |
| | Acetylenol E100 | 1.0 | 1.0 | 1.0 | 1.0 | 1.0 | 1.0 | 1.0 |

TABLE-continued

|  |  | Example 1 | Example 2 | Comparative example 1 | Comparative example 2 | Comparative example 3 | Comparative example 4 | Comparative example 5 |
|---|---|---|---|---|---|---|---|---|
|  | Deionized water | 79.0 | 82.997 | 79.0 | 79.0 | 79.0 | 83.0 | 81.0 |
|  | Total | 100.0 | 100.0 | 100.0 | 100.0 | 100.0 | 100.0 | 100.0 |
| Evaluation | Lightness (L* value) | 52 | 61 | 45 | 39 | 45 | 47 | 70 |
|  | Settleability | B | A | A | A | A | A | C |

Image Formation

Each of the ink compositions of Examples 1 and Comparative examples 1 to 3 was applied onto a PET film (OHP transparency, available from A One LLC) including an ink absorbing layer with a bar coater and then dried at room, temperature for a whole day to form a white image on the PET film serving as a substrate, thereby providing a printed material. The film of each of the white images obtained in the example and the comparative examples had a thickness of about 2.5 μm.

Evaluation of Degree of Whiteness

The degree of whiteness of each of the films obtained in the examples and the comparative examples was evaluated by visual inspection and by measuring lightness (L*value). The lightness was measured with a CM-2600d spectrocolorimeter (available from Konica Minolta, Inc.) in a specular component included (SCI) mode (including specularly reflected light).

Example 1

Figure 3:
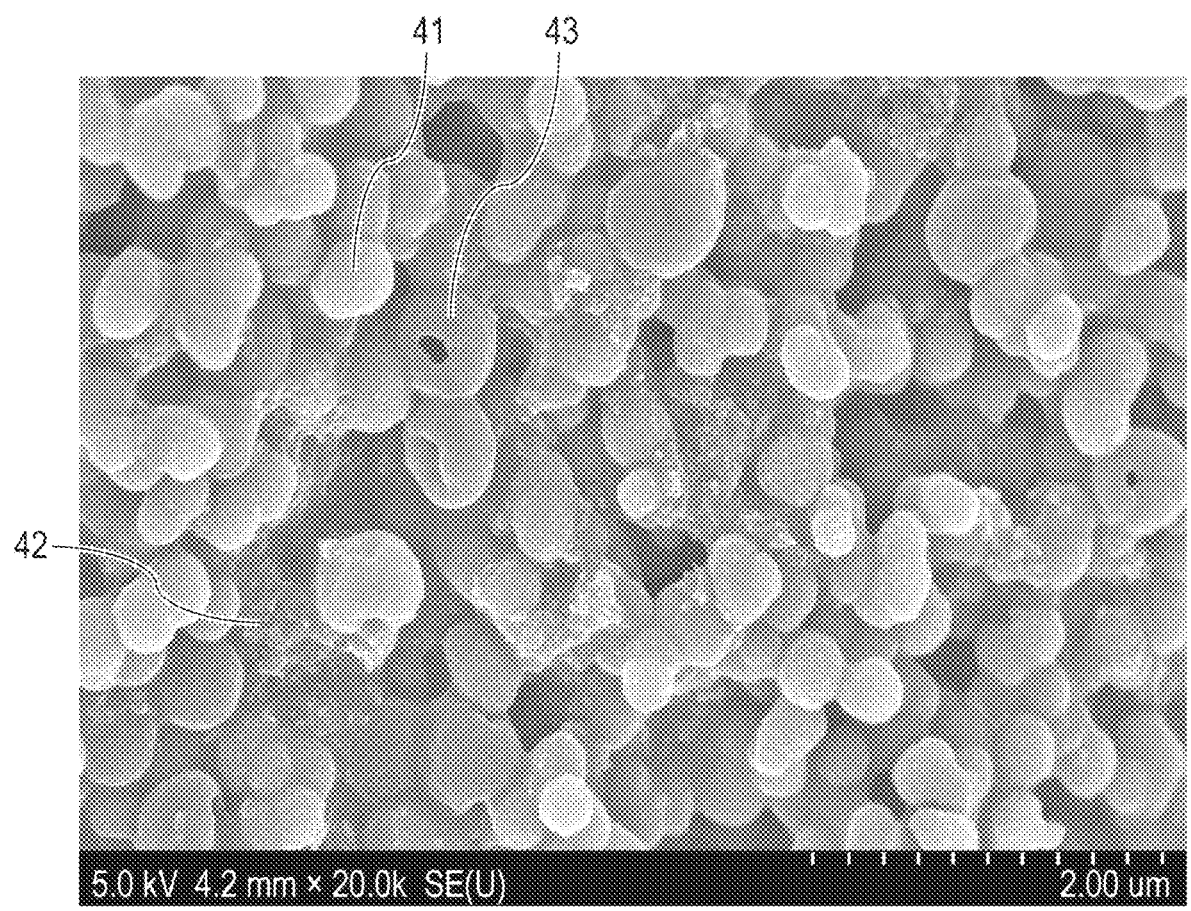
FIG. 3 is an electron micrograph of a film formed on a substrate according to Example 1.

FIG. 3 is a cross-sectional SEM image of a printed material obtained in Example 1. As illustrated in FIG. 3, a film containing titanium oxide particles 42 (titanium oxide particles B) having an average particle size of several tens of nanometers, titanium oxide particles 41 (titanium oxide particles A) having an average particle size of about 300 nm, and hollow particles 43 was obtained in Example 1. The film had many voids having a size equal to or larger than the average particle size of titanium oxide particles B and smaller than the average particle size of the hollow particles 43 among the particles. In other words, the film obtained in Example 1 included first regions A, second regions B, third regions C, and fourth regions D, these regions being arranged in a mixed manner.

The degree of whiteness of the resulting film was visually evaluated. The evaluation results indicated that the film had a sufficient degree of whiteness. The lightness (L*value) was 52.

Example 2

Figure 4:
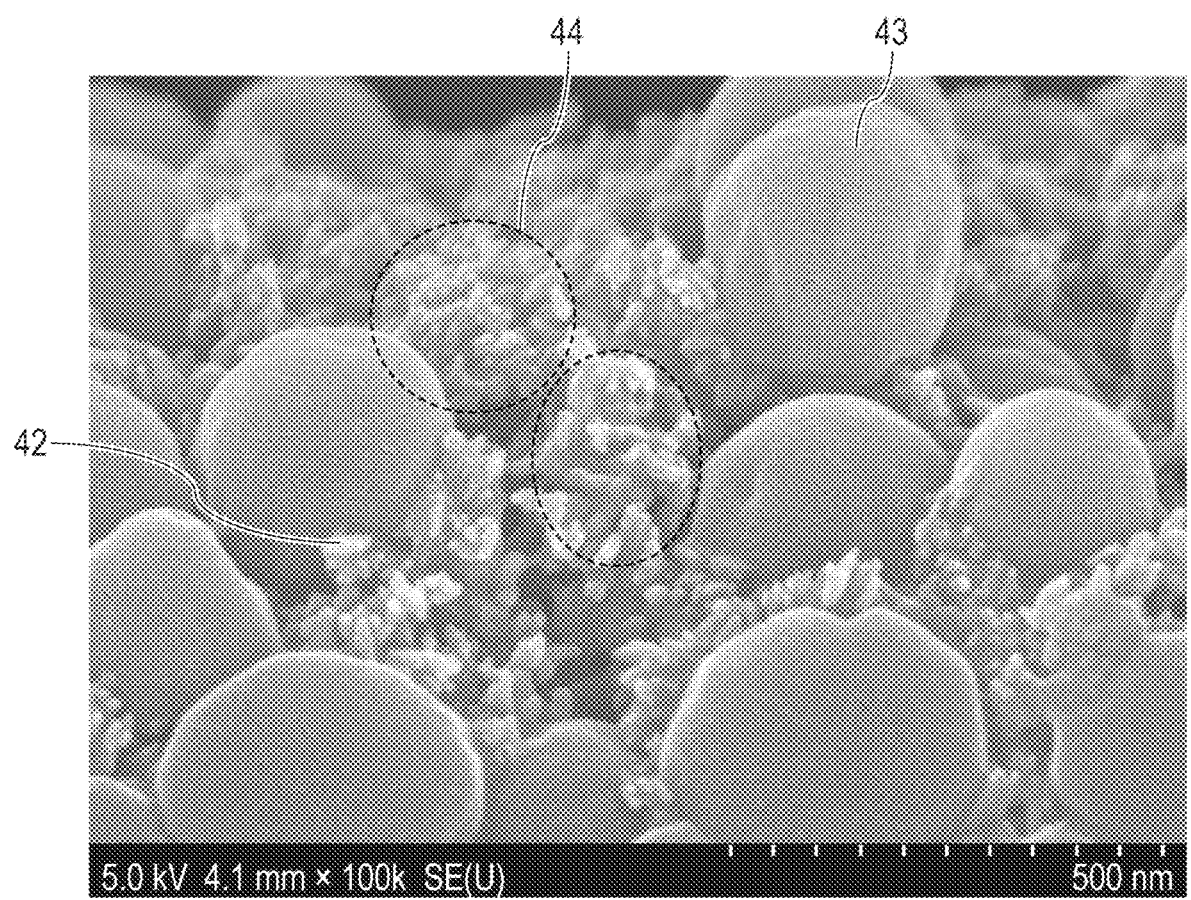
FIG. 4 is an electron micrograph of a film formed on a substrate according to Example 2.

FIG. 4 is a cross-sectional SEM image of a printed material obtained in Example 2. As illustrated in FIG. 4, a film containing the titanium oxide particles 42 (titanium oxide particles B) having an average particle size of several tens of nanometers, secondary particles 44 (average particle size: about 350 nm) formed by the aggregation of the titanium, oxide particles 42, and the hollow particles 43 was obtained in Example 2. The film had many voids having a size equal to or larger than the average particle size of titanium, oxide particles B and smaller than, the average particle size of the hollow particles 43 among the particles. In other words, the film obtained in Example 2 included, first regions A, second regions B, third regions C, and fourth regions D, these regions being arranged in a mixed manner. The first regions A were formed of the secondary particles formed by the aggregation of titanium oxide particles B.

The degree of whiteness of the resulting film was visually evaluated. The evaluation results indicated that the film had a sufficient degree of whiteness. The lightness (L*value) was 61.

Comparative Example 1

In Comparative example 1, a film containing titanium oxide particles (titanium, oxide particles B) having an average particle size of several tens of nanometers and hollow particles 43 was obtained. The film had no void, having a size equal to or larger than, the average particle size of titanium oxide particles B and smaller than the average particle size of the hollow particles 43 among the particles.

The degree of whiteness of the resulting film was visually evaluated. The evaluation results indicated that the film had a relatively insufficient degree of whiteness, compared with the film obtained in Example 1. The lightness (L*value) was 45.

Comparative Example 2

In Comparative example 2, a film containing titanium, oxide particles (titanium oxide particles B) having an average particle size of several tens of nanometers was obtained. The film had no void having a size equal to or larger than, the average particle size of titanium oxide particles B among the particles.

The degree of whiteness of the resulting film was visually evaluated. The evaluation results indicated that the film had a relatively insufficient degree of whiteness, compared with the film obtained in Example 1. The lightness (L*value) was 39.

Comparative Example 3

In Comparative example 3, a film including hollow particles was obtained.

The degree of whiteness of the resulting film was visually evaluated. The evaluation results indicated that the film had a relatively insufficient degree of whiteness, compared with the film obtained in Example 1. The lightness (L*value) was 45.

Comparative Example 4

Figure 5:
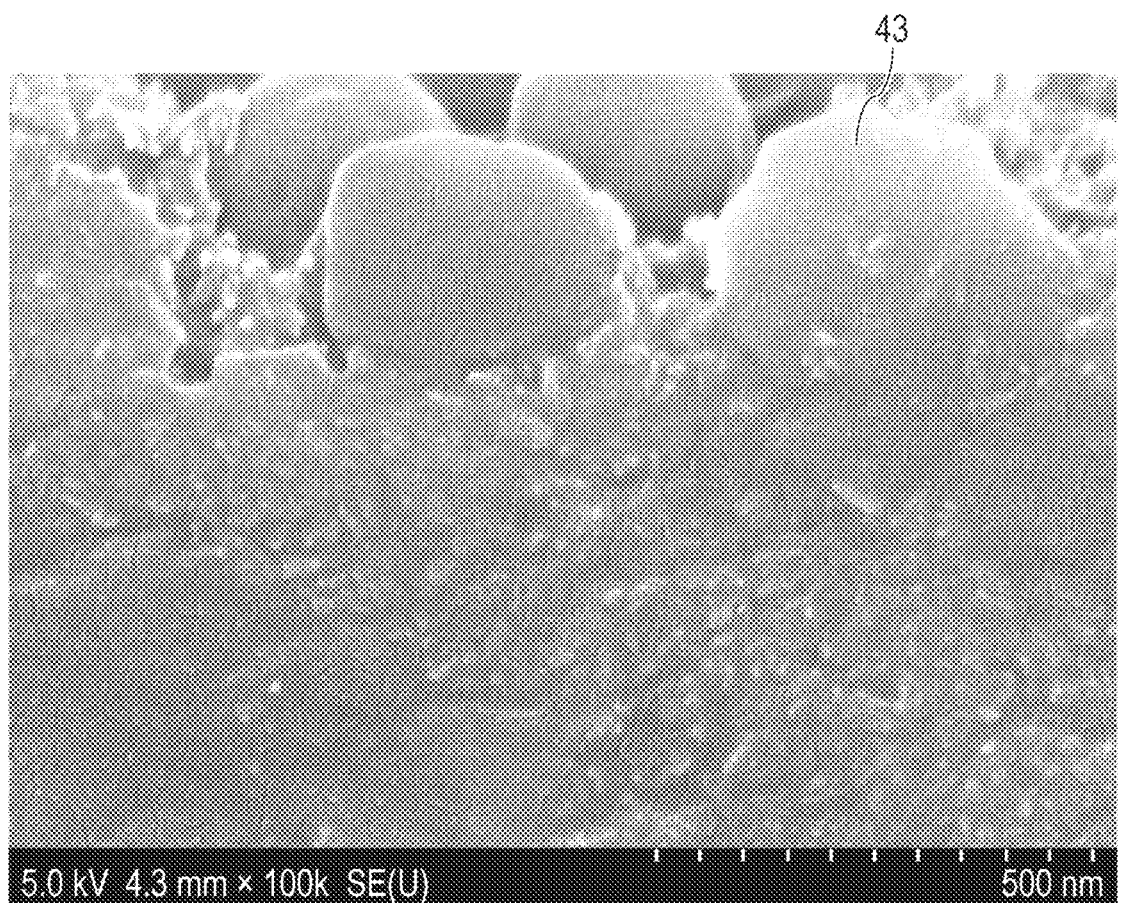
FIG. 5 is an electron micrograph of a film formed on a substrate; according to Comparative example 4.

An image formation in Comparative example 4 was performed as in Example 2, except that calcium nitrate was not used. FIG. 5 is a cross-sectional SEM image of a printed material obtained in Comparative example 4. As illustrated in FIG. 5, a film containing titanium oxide particles (titanium oxide particles B) having an average particle size of several tens of nanometers and the hollow particles 43 was obtained in Comparative example 4. The film had no void having a size equal to or larger than the average particle size of titanium oxide particles B among the particles.

The degree of whiteness of the resulting film was visually evaluated. The evaluation results indicated that the film had a relatively insufficient degree of whiteness, compared with the film obtained in Example 1, The lightness (L*value) was 47.

Comparative Example 5

In Comparative example 5, a film containing titanium oxide particles (titanium oxide particles A) having an average particle size of about 300 nm was obtained.

The degree of whiteness of the resulting film was visually evaluated. The evaluation results indicated that the film had a sufficient degree of whiteness. The lightness (L*value) was 70.

Evaluation of Settleability of Ink Composition

The settleability of each of the ink compositions of the examples and the comparative examples was evaluated. In a 50 mL glass sample bottle, 30 mL of each ink composition was placed. The bottle was hermetically sealed and allowed to stand at room temperature for two weeks (14 days). Then sample bottle was slowly tilted in order to check the presence or absence of settlings at the bottom. The settleability was evaluated according to the following evaluation criteria. When none of the particles were settled, the settleability is rated A. When some particles were settled, the settleability is rated B. When substantially all particles were settled, the settleability is rated C. Table lists the results.

Result

The film obtained in each of the examples had a sufficient degree of whiteness. The film obtained in each of the comparative examples had an insufficient degree of whiteness (except for Comparative example 5). These results indicated that in Examples 1 and 2, the films had improved degrees of whiteness.

Because the ink composition of Example 1 contained the high-refractive-index particles having a large particle size, although the settling was more inhibited than when the high-refractive-index particles having a large particle size were used alone, some high-refractive-index particles were settled if the ink composition was stored for prolonged periods of time. In contrast, the ink composition of Example 2 did not contain high-refractive-index particles having a large particle size; thus, the high-refractive-index particles were less likely to be settled even if the ink composition was stored for prolonged periods of time. The results indicated that in Example 2, the resulting film had an improved degree of whiteness and, furthermore, the ink composition had higher storage stability, According to an embodiment of the present invention, a film having a higher degree of whiteness than ever before can be formed while the settling of particles in an ink is inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming method comprising:
   forming a white image on a substrate by applying an ink composition comprising titanium oxide particles having an average particle size of 10 nm or more and 100 nm or less and an aggregating agent that aggregates the titanium oxide particles,
   wherein the aggregating agent is at least one of an inorganic polyvalent metal salt which is soluble in water and an organic acid,
   the image includes first regions, second regions, and third regions, the first regions, the second regions, and the third regions being defined by a refractive index and a region size and being present in a mixed manner in a cross section parallel to a thickness direction of the substrate,
   the first regions and the second regions have a refractive index at least 0.4 higher than the third regions,
   the second regions are formed of the titanium oxide particles that have not been aggregated by the aggregating agent,
   the first regions are formed of the titanium oxide particles that have been aggregated by the aggregating agent, the first regions having an equivalent circular diameter of 250 nm or more,
   the third regions have an equivalent circular diameter of more than 100 nm.

2. The image forming method according to claim 1, wherein the first regions have a refractive index of 1.7 or higher and 2.8 or lower.

3. The image forming method according to claim 1, wherein the third regions have a refractive index of 1.0 or higher and lower than 1.7.

4. The image forming method according to claim 1, wherein the white image further includes fourth regions in the cross section parallel to the thickness direction of the substrate,
   the first regions and the second regions have a refractive index at least 0.4 higher than the fourth regions, and
   the fourth regions have an equivalent circular diameter equal to or more than the average particle size of the titanium oxide particles and less than the equivalent circular diameter of the third regions.

5. The image forming method according to claim 1, wherein a volume ratio of the third regions in the white image is 30% or more and 60% or less.

6. The image forming method according to claim 1, wherein the ink composition further comprises hollow particles, and the third regions are formed of the hollow particles.

7. The image forming method according to claim 1, wherein the ink composition further comprises water, and
   the aggregating agent aggregates the titanium oxide particles by evaporation of water.

8. The image forming method according to claim 1, wherein the ink composition is applied to the substrate by an inkjet method.

9. The image forming method according to claim 4, wherein the fourth regions have a refractive index of 1.0 or higher and lower than 1.7.

10. The image forming method according to claim 4, wherein the fourth regions are formed of voids.

* * * * *